W. S. HARLEY.
MOTOR CYCLE FRAME STRUCTURE FOR V-TYPE MOTORS.
APPLICATION FILED SEPT. 13, 1918.

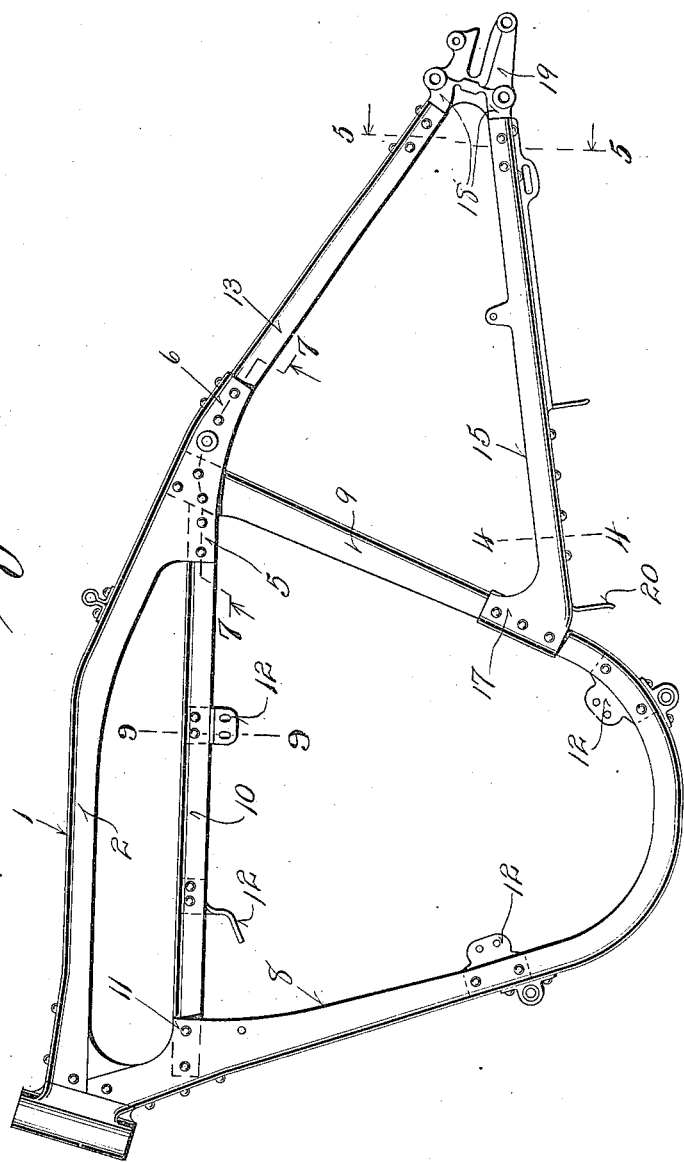

1,293,643.

Patented Feb. 4, 1919.
3 SHEETS—SHEET 2.

WITNESS:
J. F. Britt

INVENTOR
William S. Harley
BY
Geo. S. Young
ATTORNEY

W. S. HARLEY.
MOTOR CYCLE FRAME STRUCTURE FOR V-TYPE MOTORS.
APPLICATION FILED SEPT. 13, 1918.
1,293,643.
Patented Feb. 4, 1919.
3 SHEETS—SHEET 3.
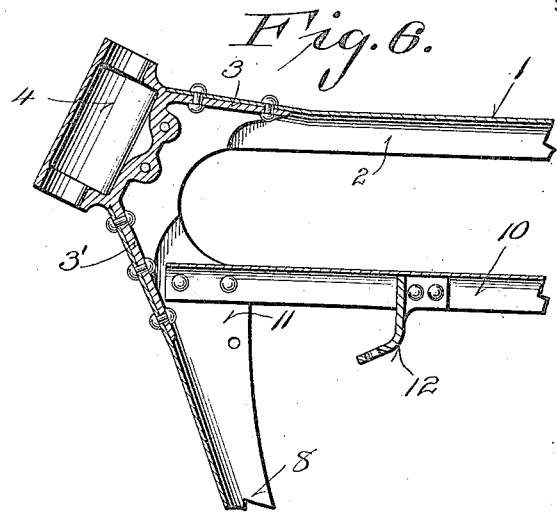
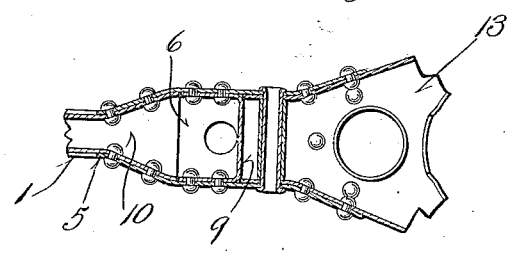
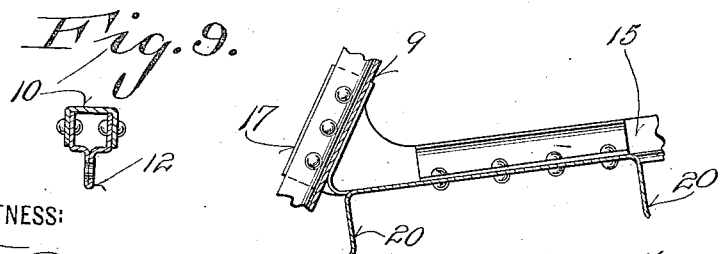
WITNESS:
INVENTOR
William S. Harley
BY
ATTORNEY

# UNITED STATES PATENT OFFICE.

WILLIAM S. HARLEY, OF MILWAUKEE, WISCONSIN, ASSIGNOR TO HARLEY-DAVIDSON MOTOR COMPANY, OF MILWAUKEE, WISCONSIN.

MOTOR-CYCLE-FRAME STRUCTURE FOR V-TYPE MOTORS.

1,293,643.     Specification of Letters Patent.     Patented Feb. 4, 1919.

Application filed September 13, 1918. Serial No. 253,891.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Motor-Cycle-Frame Structures for V-Type Motors, and I do hereby declare that the following is a full, clear, and exact description thereof.

My present invention refers to new and useful improvements in motor cycle frames, particularly for V-type motors, the same being somewhat similar to the frame illustrated in my co-pending application Serial No. 218,078 filed February 19, 1918. Said application, however, refers to frames for use with motors, the cylinders of which are opposed and horizontally disposed.

The aim of the present invention is the construction of a frame for the V-type of motor in which all of the principal parts are formed of sheet metal, the upper and lower reach bars, the head bar and seat mast being of channeled bars, and the rear fork members of single plates of metal having their outer edge portions bent laterally to provide reinforcing.

With this general object in view the invention resides in the novel features of construction, combination and arrangement of parts which will be hereinafter more particularly described and claimed and shown in the drawings wherein:

Figure 1 represents a side elevational view of a frame constructed in accordance with my invention.

Figure 5:
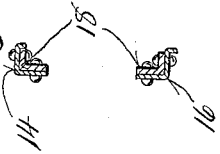
Figure 4:
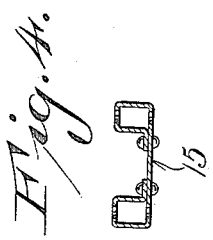

Figs. 4 and 5 are detail transverse sectional views taken respectively on the planes of the lines 4—4 and 5—5 of Fig. 1.

Figure 2:
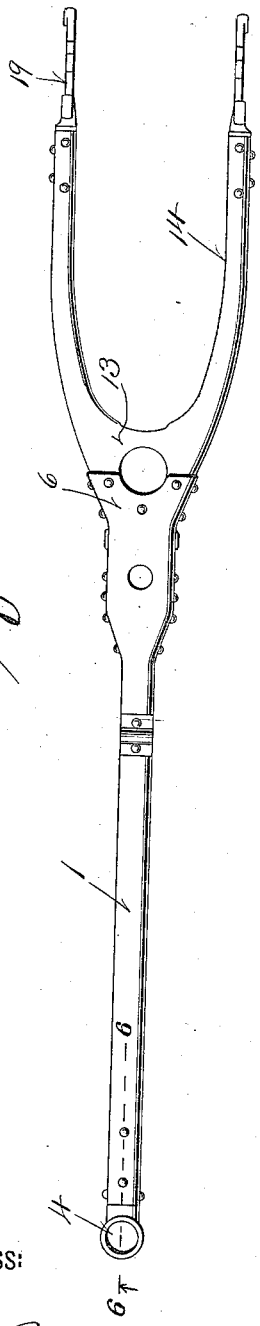
Fig. 2 is a plan view of the parts shown in Fig. 1.

Fig. 6 is a detail longitudinal sectional view on the line 6—6 of Fig 2.

Fig. 7 is a section taken approximately on the plane of the line 7—7 of Fig. 1.

Figure 3:
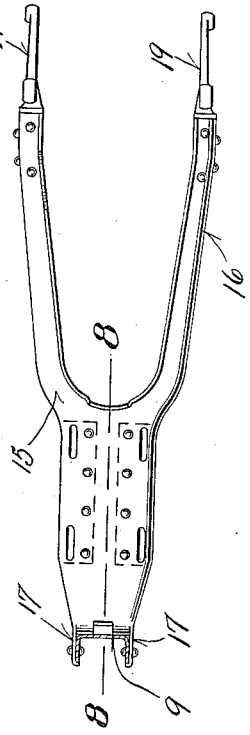
Fig. 3 is a bottom plan view of the lower rear fork member.

Fig. 8 is a vertical section on the line 8—8 of Fig. 3, and

Fig. 9 is a detail transverse section on the line 9—9 of Fig. 1.

Referring more particularly to the drawings the numeral 1 indicates an upper reach bar having downwardly extending side flanges 2, the forward end portions of which straddle the rearwardly extending arm 3 of a steering head 4. The flanges 2 at the rear end of the reach bar 1 are increased in width as illustrated at 5 and are also spread laterally to provide a pocket shown at 6 (see particularly Fig. 7).

A combined head bar 8 and seat mast 9 are formed from a single channeled bar bent into U-shape, the arms of the U from which the head bar and seat mast are formed being diverged. The flanges of the head bar 8 straddle a downwardly and rearwardly extending arm 3' of the steering head 4 and are riveted or otherwise secured thereto as in the case of the flanges 2 of the upper reach bar 1. The end portions of the flanges of the seat mast 9, on the other hand, are positioned between the flanges 2 substantially midway the length of the pocket 6 and secured therein.

The upper end portions of the head bar and seat mast are braced by a channeled bar which forms the lower reach bar 10, the front end of the latter being disposed between the widened portions 11 of the flanges of the head bar, which flanges are riveted to the corresponding flanges of the former. Similarly the rear end of the lower reach bar 10 is positioned between the widened portions 5 of the flanges 2 and riveted or bolted thereto.

Within the space inclosed by the U-shaped bar, from which the head bar and seat mast are formed, and the lower reach bar 10, a motor is adapted to be supported, preferably by the brackets 12. Owing to the channeled shaped parts of the frame thus far described, it is obvious that the same will provide a very strong and rigid motor support.

If considered desirable the upper reach bar 1 and the upper fork member 13 may be stamped from a single sheet of metal of the necessary gage, but in the present embodiment of the invention these two parts are separately formed and secured together by the rivets or the like as shown in Figs. 1 and 2. The upper fork member is substantially in the shape of a V-shaped plate having its apex disposed in said pocket 6 at the rear end of the reach bar 1. The edge portions of this plate, which includes the fork arms 14, are bent laterally to produce the necessary reinforcing flanges.

The lower fork member 15 is of similar shape to the upper fork member and has a pair of fork arms 16 which are substantially right angular in cross section. At the apex of the lower fork member is formed a pair of horizontally spaced, vertically disposed attaching flanges 17 adapted to straddle the seat mast 9 intermediate its ends and at the point where it merges into the base of the bar of which it forms a part. The free ends of the corresponding arms of the fork members are connected to the diverging arms 18 of axle plates 19. The lower fork bar also has a pair of depending bracket arms 20 between which a muffler of preferred design is hung.

Said fork members owing to their arrangement and the manner in which they are connected with the central part of the cycle frame will effectively reinforce the latter. As set forth in the application hereinbefore referred to a frame constructed of sheet material may be not only manufactured at considerable less expense than the usual type of frame, but will also be very much stronger. The consequent result of this being that the frame is of very light, yet strong construction, and the motor cycle of which it forms a part will be lighter and will stand much rougher usage than such cycles not built in accordance with this invention.

Various minor changes may be made in the form and proportion of the several parts of this invention to accommodate it for use in connection with motors of various sizes and those not of the fork type hereinbefore referred to.

I claim:

1. A cycle frame comprising an upper reach bar and a head bar each formed of a channeled member, the upper end of the latter being connected with the forward end of the former, a lower reach bar having its forward end disposed between the flanges of the head bar and secured thereto, its rear end being secured between the rear end portions of the flanges of the upper reach bar, and a seat mast having its upper end secured between the flanges of the upper reach bar.

2. A cycle frame comprising a steering head having a pair of spaced laterally extending arms, a channeled reach bar having its forward end straddling the upper arm of said head, and a combined head bar and seat mast formed from a single channeled bar bent into U-shape, the upper end of the head bar portion straddling the lower arm of said head and secured thereto, the upper end of the seat mast portion being disposed between the flanges of the rear end of the reach bar and secured thereto.

3. A cycle frame comprising a channeled reach bar, a combined head bar and seat mast formed from a single channeled bar bent into U-shape, the upper end of the head bar portion being connected with the forward end of the reach bar, the upper end of the seat mast portion being disposed between the flanges of the reach bar and secured thereto, an upper fork member having the connected ends of its arms joined with the rear end of the reach bar, and a lower fork member having the connected ends of its arms secured to the seat mast portion, the free ends of its arms being connected with the free ends of the corresponding arms of the other fork member.

4. A cycle frame comprising a reach bar, a head bar having its upper end connected with the forward end of the reach bar, a seat mast having its upper end connected with the rear end of the reach bar, an upper fork member having the connected ends of its arms joined with the rear end of said reach bar, a lower fork member formed from a substantially V-shaped plate of material, and a pair of horizontally spaced vertical flanges formed at the apex of said V-shaped plate to straddle the seat mast, the same being secured thereto, the free ends of the corresponding arms of the fork members being secured together.

In testimony that I claim the foregoing I have hereunto set my hand at Milwaukee, in the county of Milwaukee and State of Wisconsin.

WILLIAM S. HARLEY.

Copies of this patent may be obtained for five cents each, by addressing the "Commissioner of Patents, Washington, D. C."